(12) United States Patent
Yau et al.

(10) Patent No.: US 11,056,970 B1
(45) Date of Patent: Jul. 6, 2021

(54) BRIDGELESS STEP-UP AND STEP-DOWN AC-TO-DC CONVERTER

(71) Applicant: ASIAN POWER DEVICES INC., Taoyuan (TW)

(72) Inventors: Yeu-Torng Yau, Taoyuan (TW); Tsung-Liang Hung, Taoyuan (TW)

(73) Assignee: ASIAN POWER DEVICES INC., Taoyuan (TW)

(*) Notice: Subject to any disclaimer, the term of this patent is extended or adjusted under 35 U.S.C. 154(b) by 0 days.

(21) Appl. No.: 16/821,681

(22) Filed: Mar. 17, 2020

(30) Foreign Application Priority Data

Feb. 17, 2020 (TW) .................................. 109104957

(51) Int. Cl.
*H02M 1/42* (2007.01)
*H02M 7/217* (2006.01)

(52) U.S. Cl.
CPC ......... *H02M 1/4208* (2013.01); *H02M 7/217* (2013.01); *H02M 1/4225* (2013.01); *H02M 1/4233* (2013.01)

(58) Field of Classification Search
CPC ............. H02M 1/4208; H02M 1/4233; H02M 1/4225; H02M 7/217
See application file for complete search history.

(56) References Cited

U.S. PATENT DOCUMENTS

2007/0279955 A1* 12/2007 Liu ..................... H02M 1/4208
 363/125
2014/0354247 A1* 12/2014 Xu ..................... H02M 1/4225
 323/207

FOREIGN PATENT DOCUMENTS

TW 200743925 A 12/2007

* cited by examiner

*Primary Examiner* — Rafael O De Leon Domenech
(74) *Attorney, Agent, or Firm* — Muncy, Geissler, Olds & Lowe, P.C.

(57) ABSTRACT

A bridgeless step-up and step-down AC-to-DC converter is used to convert an AC input power source into a DC output power source. The converter includes a first circuit, a second circuit, a third circuit, a third diode, and a fourth diode. The first circuit has a first end, a second send, and a third end; the first end is coupled to the AC input power source, the second end is coupled to a ground end, and the third end is coupled to the DC output power source. The second circuit has a first end, a second end, and a third end; the first end is coupled to the AC input power source, the second end is coupled to the ground end, and the third end is coupled to the DC output power source.

9 Claims, 7 Drawing Sheets

BRIDGELESS STEP-UP AND STEP-DOWN AC-TO-DC CONVERTER

BACKGROUND

Technical Field

The present disclosure relates to an AC-to-DC converter, and more particularly to a bridgeless step-up and step-down AC-to-DC converter.

Description of Related Art

The statements in this section merely provide background information related to the present disclosure and do not necessarily constitute prior art.

The traditional boost power factor correction converter (boost PFC) is still widely used in industry because of its simple circuit structure, and its typical circuit structure is shown in FIG. 1. However, there are three main disadvantages of the boost PFC. The first one, the input of the boost PFC must use bridge rectifier diodes so that the conduction loss of the diodes as a percentage of the total loss is high. Also, the lower AC input voltage, the more efficiency loss. The second one, since the output voltage of the step-up PFC converter must be higher than the peak value of the input AC power voltage, 400-volt or even 450-volt electrolytic capacitors must be used, and the price of electrolytic capacitors will increase as the increased withstand voltage. The third one, when the switch is instantaneously turned on so that the high-voltage AC power source will uncontrolledly charge the electrolytic capacitor with large capacity through the rectifier diode, causing surge currents much higher than the current in normal operation, and therefore which must be suppressed by using a thermistor and a relay to increase costs and reduce efficiency.

FIG. 2 to FIG. 6 show circuit diagrams of bridgeless PFC converters of the related art, and the loss of the bridge rectifier diodes can be reduced, but the disadvantages of inrush current and high output voltage cannot be overcome.

FIG. 7 and FIG. 8 show circuit diagrams of bridgeless buck boost AC-to-DC converters, and the loss of the bridge rectifier diodes can be reduced, the inrush current can be overcome, and the output voltage can be reduced. However, this circuit structure has caused the problem of too many components and high costs.

SUMMARY

An object of the present disclosure is to provide a bridgeless step-up and step-down AC-to-DC converter to solve problems of the loss of the bridge rectifier diodes, the inrush current, the high output voltage, and too many components and high costs.

In order to achieve the above-mentioned object, the bridgeless step-up and step-down AC-to-DC converter is used to convert an AC input power source into a DC output power source with a positive end and a negative end across an output capacitor. The bridgeless step-up and step-down AC-to-DC converter includes a first circuit, a second circuit, a third diode, and a fourth diode. The first circuit has a first end, a second end, and a third end; the first end is coupled to a first end of the AC input power source, the second end is coupled to a ground end, and the third end is coupled to the positive end or the negative end of the DC output power source. The second circuit has a first end, a second end, and a third end; the first end is coupled to a second end of the AC input power source, the second end is coupled to the ground end, and the third end is coupled to the positive end or the negative end of the DC output power source. The third diode is coupled between the first end of the second circuit and the ground end. The fourth diode is coupled between the first end of the first circuit and the ground end.

In one embodiment, the first circuit includes a first switch, a first inductor, and a first diode. The first switch has a first end, a second end, and a control end; the first end of the first switch is coupled to the first end of the AC input power source. The first inductor has a first end and a second end; the first end of the first inductor is coupled to the second end of the first switch, and the second end of the first inductor is coupled to the ground end. The first diode has a cathode end and an anode end; the cathode end of the first diode is coupled to the second end of the first switch and the first end of the first inductor, and the anode end of the first diode is coupled to the positive end or the negative end of the DC output power source.

In one embodiment, the second circuit includes a second switch, a second inductor, and a second diode. The second switch has a first end, a second end, and a control end; the first end of the second switch is coupled to the second end of the AC input power source. The second inductor has a first end and a second end; the first end of the second inductor is coupled to the second end of the second switch, and the second end of the second inductor is coupled to the ground end. The first diode has a cathode end and an anode end; the cathode end of the second diode is coupled to the second end of the second switch and the first end of the second inductor, and the anode end of the second diode is coupled to the positive end or the negative end of the DC output power source.

In one embodiment, the control end of the first switch receives a first control signal; when the AC input power source is in a positive half cycle and the first control signal turns on the first switch, the first inductor stores energy; when the AC input power source is in the positive half cycle and the first control signal turns off the first switch, the first inductor releases energy.

In one embodiment, the first inductor stores energy through a positive half cycle energy-storing loop; the positive half cycle energy-storing loop is formed by the AC input power source, the first switch, the first inductor, the third diode, and the AC input power source.

In one embodiment, the first inductor releases energy through a positive half cycle energy-releasing loop; the positive half cycle energy-releasing loop is formed by the first inductor, a load coupled between the positive end and the negative end of the DC output power source, the first diode, and the first inductor.

In one embodiment, the control end of the second switch receives a second control signal; when the AC input power source is in a negative half cycle and the second control signal turns on the second switch, the second inductor stores energy; when the AC input power source is in the negative half cycle and the second control signal turns off the second switch, the second inductor releases energy.

In one embodiment, the second inductor stores energy through a negative half cycle energy-storing loop; the negative half cycle energy-storing loop is formed by the AC input power source, the second switch, the second inductor, the fourth diode, and the AC input power source.

In one embodiment, the second inductor releases energy through a negative half cycle energy-releasing loop; the negative half cycle energy-releasing loop is formed by the second inductor, a load coupled between the positive end and the negative end of the DC output power source, the second diode, and the second inductor.

In one embodiment, the negative end of the DC output power source is coupled to the ground end.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1:
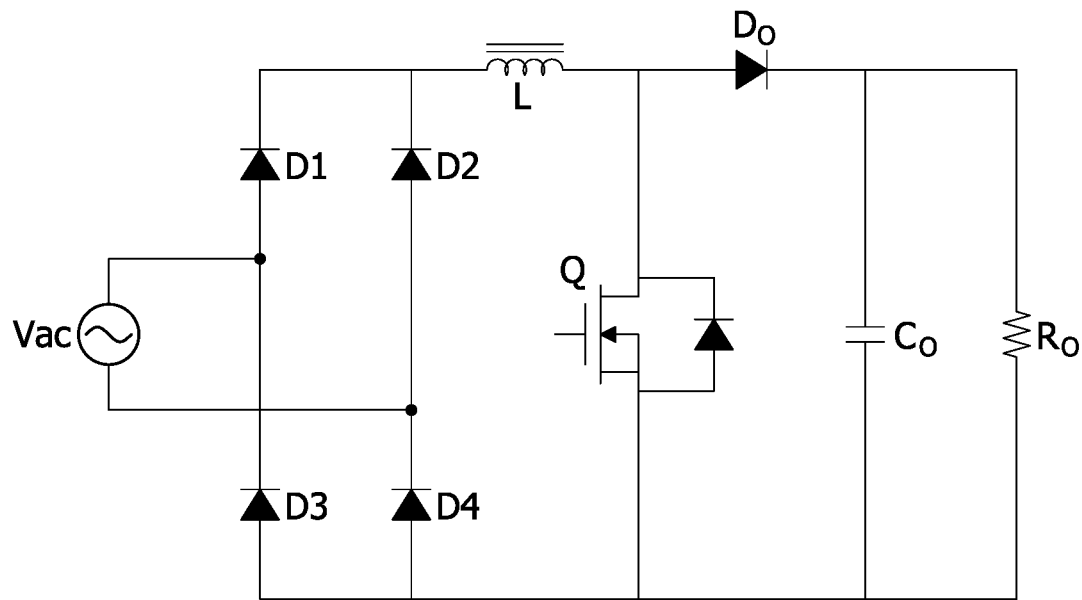
FIG. 1 is a circuit diagram of a boost PFC converter of the related art.
Figure 2:
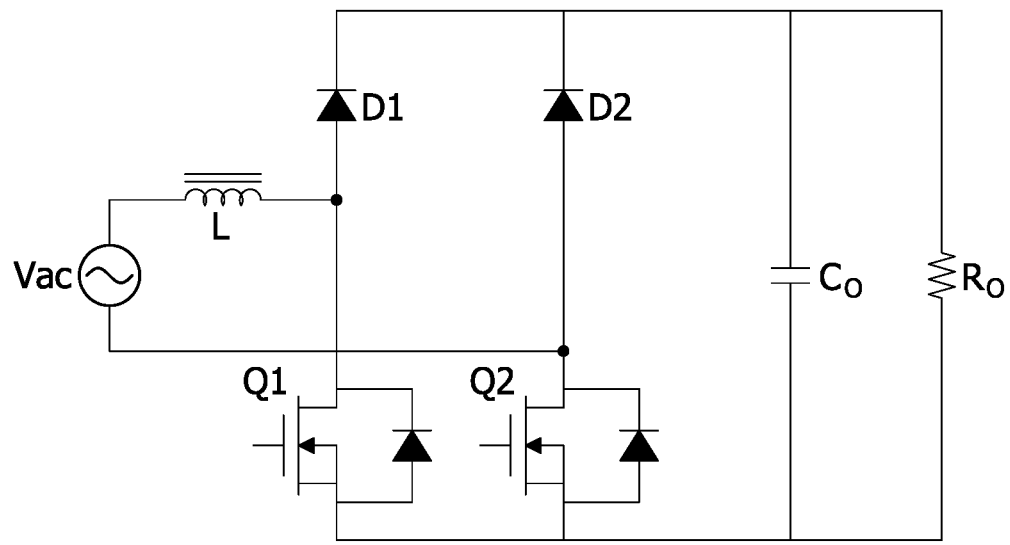
FIG. 2 to FIG. 6 are circuit diagrams of bridgeless PFC converters of the related art.
Figure 3:
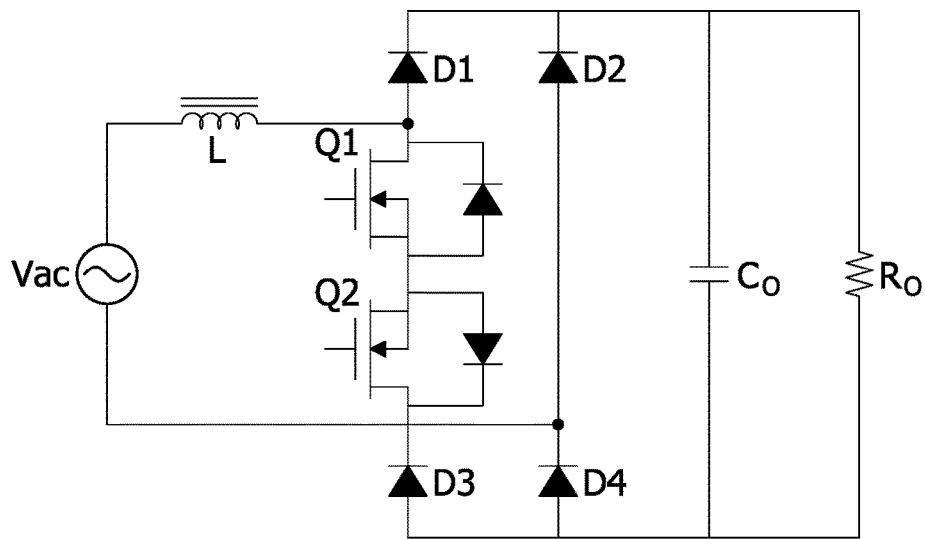
Figure 4:
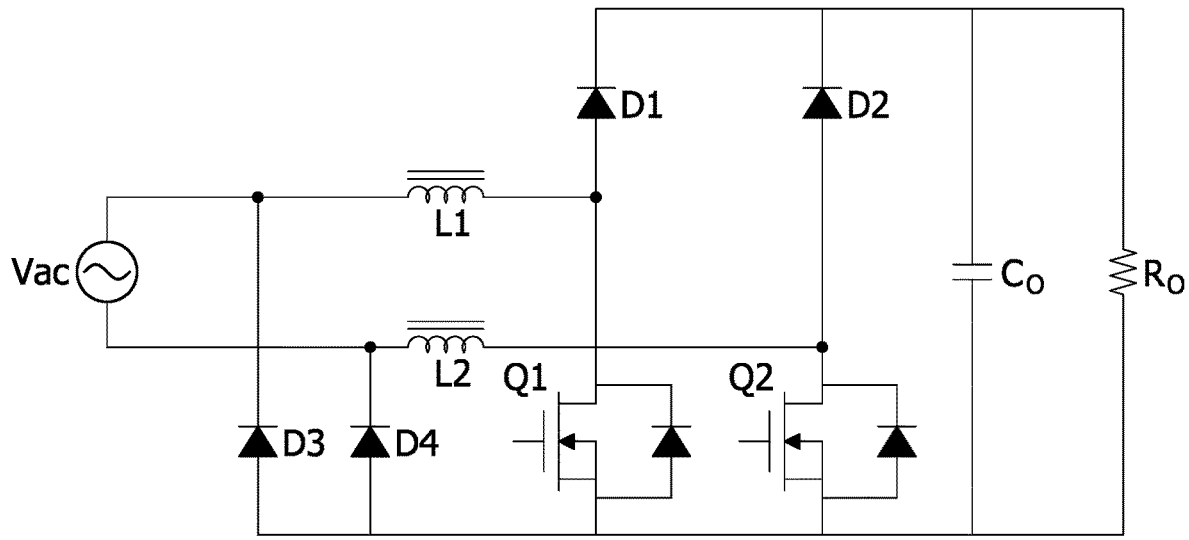
Figure 5:
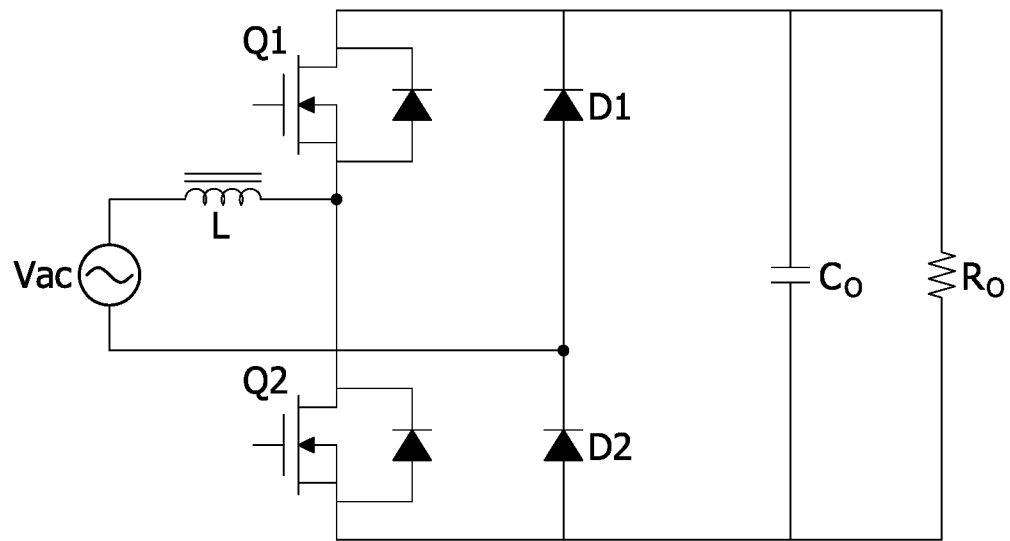
Figure 6:
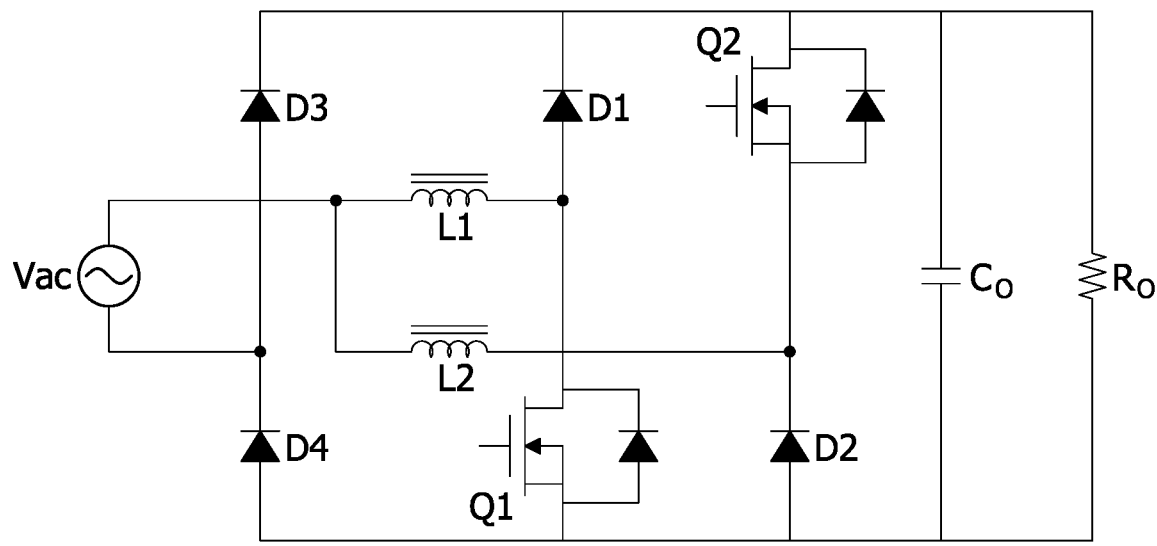
Figure 7:
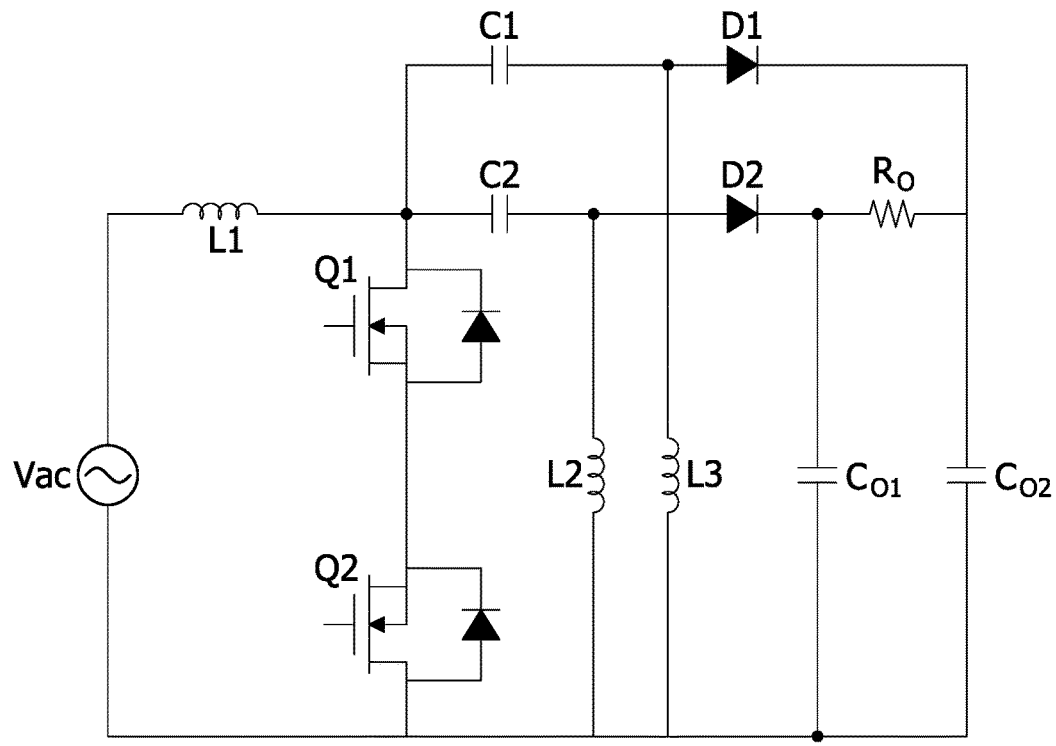
FIG. 7 and FIG. 8 are circuit diagrams of bridgeless buck boost AC-to-DC converters of the related art.
Figure 8:
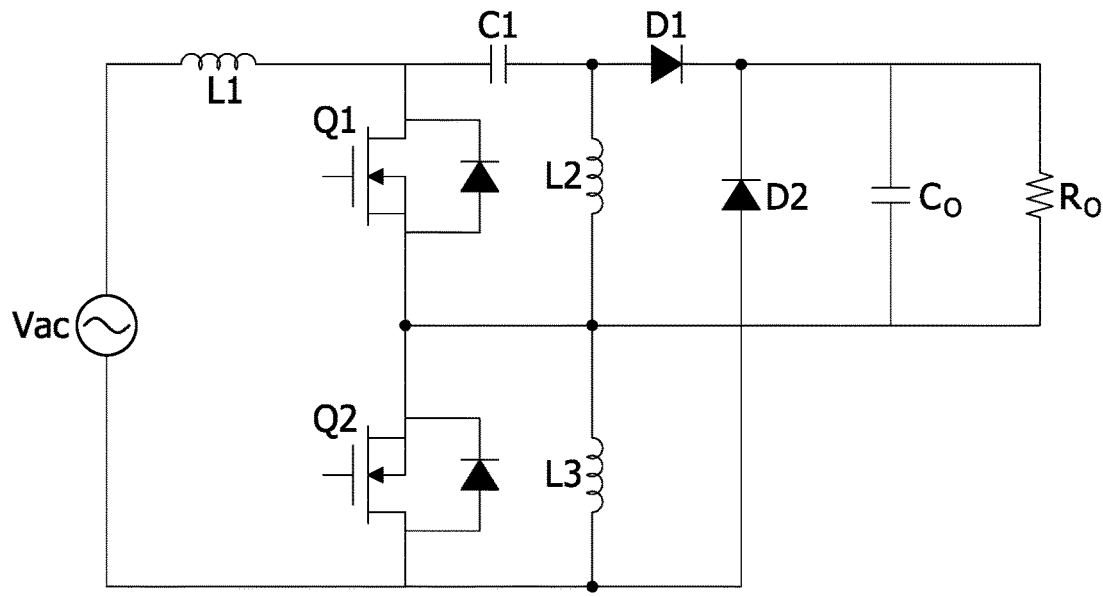

Reference will now be made to the drawing figures to describe the present disclosure in detail. It will be understood that the drawing figures and exemplified embodiments of present disclosure are not limited to the details thereof.

Figure 9:
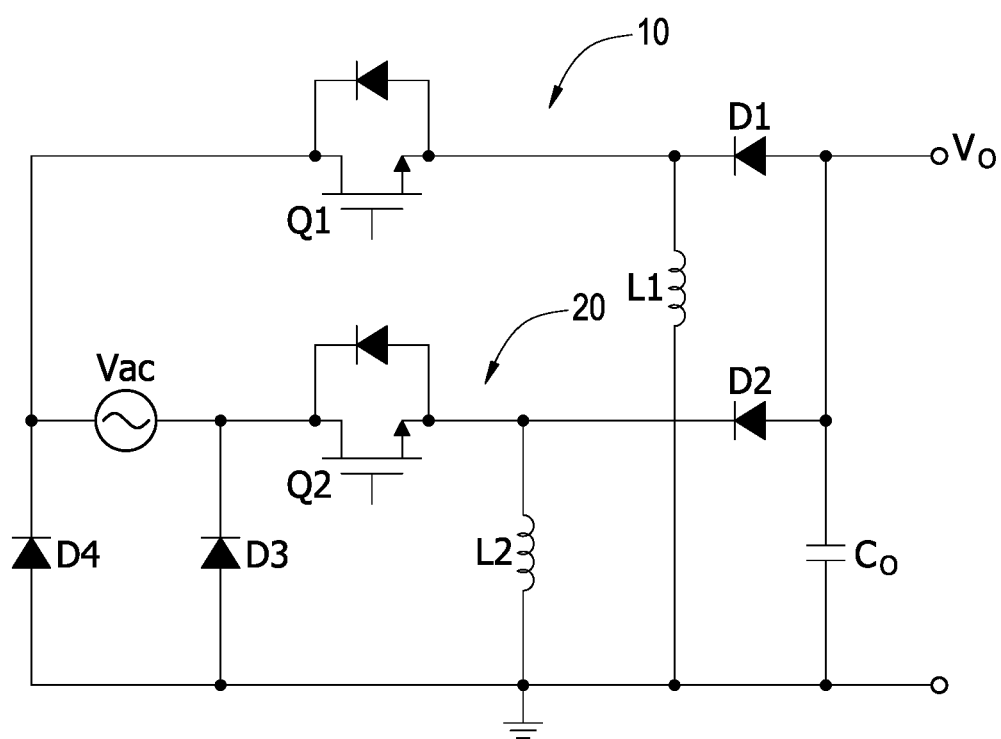
FIG. 9 is a circuit diagram of a bridgeless step-up and step-down AC-to-DC converter according to the present disclosure.

Please refer to FIG. 9, which shows a circuit diagram of a bridgeless step-up and step-down AC-to-DC converter according to the present disclosure. The bridgeless step-up and step-down AC-to-DC converter is used to convert an AC input power source Vac into a DC output power source Vo with a positive end and a negative end across an output capacitor Co. The bridgeless step-up and step-down AC-to-DC converter includes a first circuit 10, a second circuit 20, a third diode D3, and a fourth diode D4.

The first circuit 10 has a first end, a second end, and a third end. The first end is coupled to a first end of the AC input power source Vac, the second end is coupled to a ground end, and the third end is coupled to the positive end or the negative end of the DC output power source Vo. The second circuit 20 has a first end, a second end, and a third end. The first end is coupled to a second end of the AC input power source Vac, the second end is coupled to the ground end, and the third end is coupled to the positive end or the negative end of the DC output power source Vo. The third diode D3 is coupled between the first end of the second circuit 20 and the ground end. The fourth diode D4 is coupled between the first end of the first circuit 10 and the ground end. The negative end of the DC output power source Vo is coupled to the ground end.

Specifically, the first circuit 10 includes a first switch Q1, a first inductor L1, and a first diode D1. The first switch Q1 has a first end, a second end, and a control end, such as a three-end power switch component. The first end of the first switch Q1 is coupled to the first end of the AC input power source Vac. The first inductor L1 has a first end and a second end. The first end of the first inductor L1 is coupled to the second end of the first switch Q1, and the second end of the first inductor L1 is coupled to the ground end. The first diode D1 has a cathode end and an anode end. The cathode end of the first diode D1 is coupled to the second end of the first switch Q1 and the first end of the first inductor L1. The anode end of the first diode D1 is coupled to the positive end or the negative end of the DC output power source Vo.

Specifically, the second circuit 20 includes a second switch Q2, a second inductor L2, and a second diode D2. The second switch Q2 has a first end, a second end, and a control end, such as a three-end power switch component. The first end of the second switch Q2 is coupled to the second end of the AC input power source Vac. The second inductor L2 has a first end and a second end. The first end of the second inductor L2 is coupled to the second end of the second switch Q2, and the second end of the second inductor L2 is coupled to the ground end. The second diode D2 has a cathode end and an anode end. The cathode end of the second diode D2 is coupled to the second end of the second switch Q2 and the first end of the second inductor L2. The anode end of the second diode D2 is coupled to the positive end or the negative end of the DC output power source Vo.

Figure 10A:
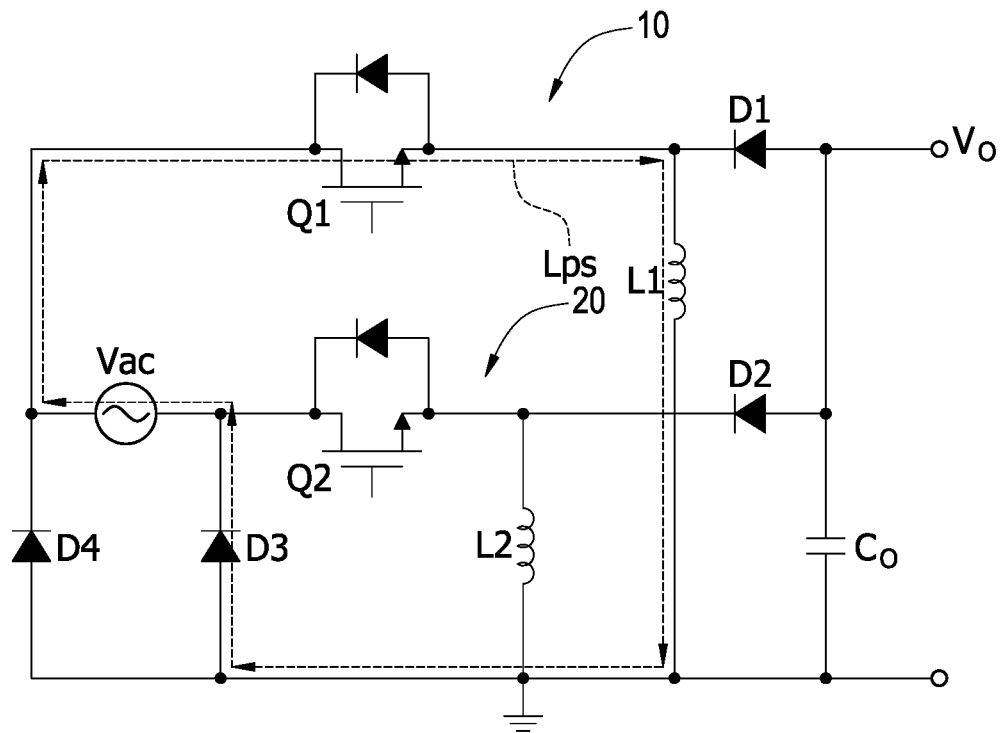
FIG. 10A is a circuit diagram of the bridgeless step-up and step-down AC-to-DC converter in a positive half cycle energy-storing operation according to the present disclosure.
Figure 10B:
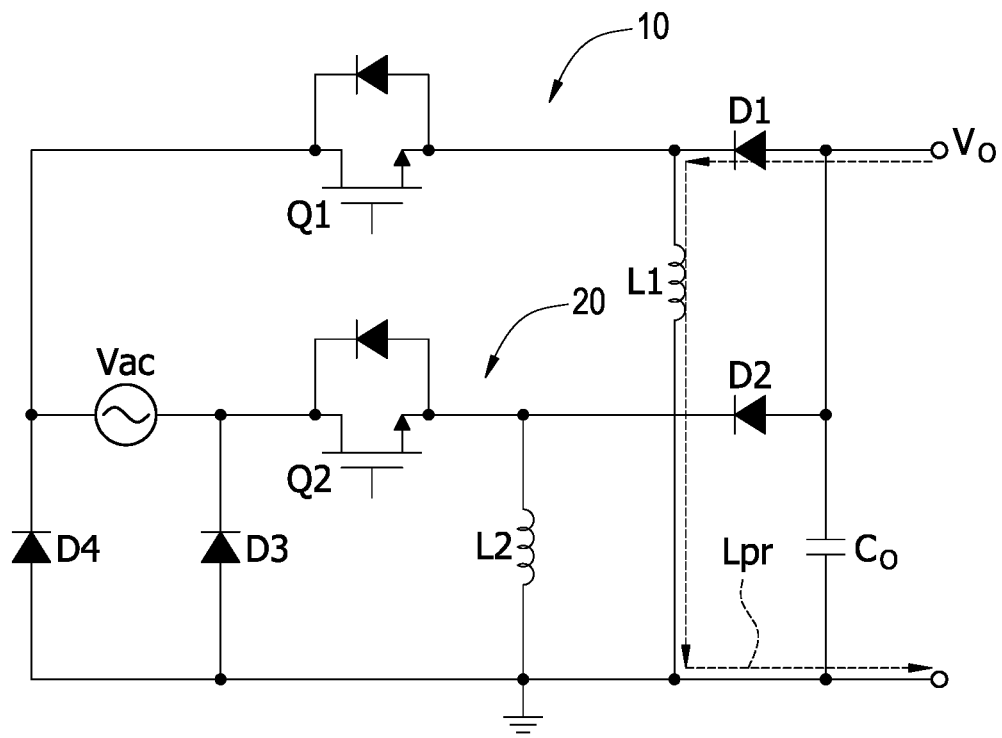
FIG. 10B is a circuit diagram of the bridgeless step-up and step-down AC-to-DC converter in a positive half cycle energy-releasing operation according to the present disclosure.

Please refer to FIG. 10A and FIG. 10B, which show circuit diagrams of the bridgeless step-up and step-down AC-to-DC converter in a positive half cycle energy-storing operation and in a positive half cycle energy-releasing operation according to the present disclosure, respectively. The control end of the first switch Q1 receives a first control signal. When the AC input power source Vac is in a positive half cycle and the first control signal turns on the first switch Q1, the first inductor L1 stores energy. When the AC input power source Vac is in the positive half cycle and the first control signal turns off the first switch Q1, the first inductor L1 releases energy.

As shown in FIG. 10A, the first inductor L1 stores energy through a positive half cycle energy-storing loop Lps. The positive half cycle energy-storing loop Lps is formed by the AC input power source Vac, the first switch Q1, the first inductor L1, the third diode D3, and the AC input power source Vac. In this operation, the second switch Q2 can be turned on or turned off.

As shown in FIG. 10B, the first inductor L1 releases energy through a positive half cycle energy-releasing loop Lpr. The positive half cycle energy-releasing loop Lpr is formed by the first inductor L1, a load (not shown) coupled between the positive end and the negative end of the DC output power source Vo, the first diode D1, and the first inductor L1.

Figure 11A:
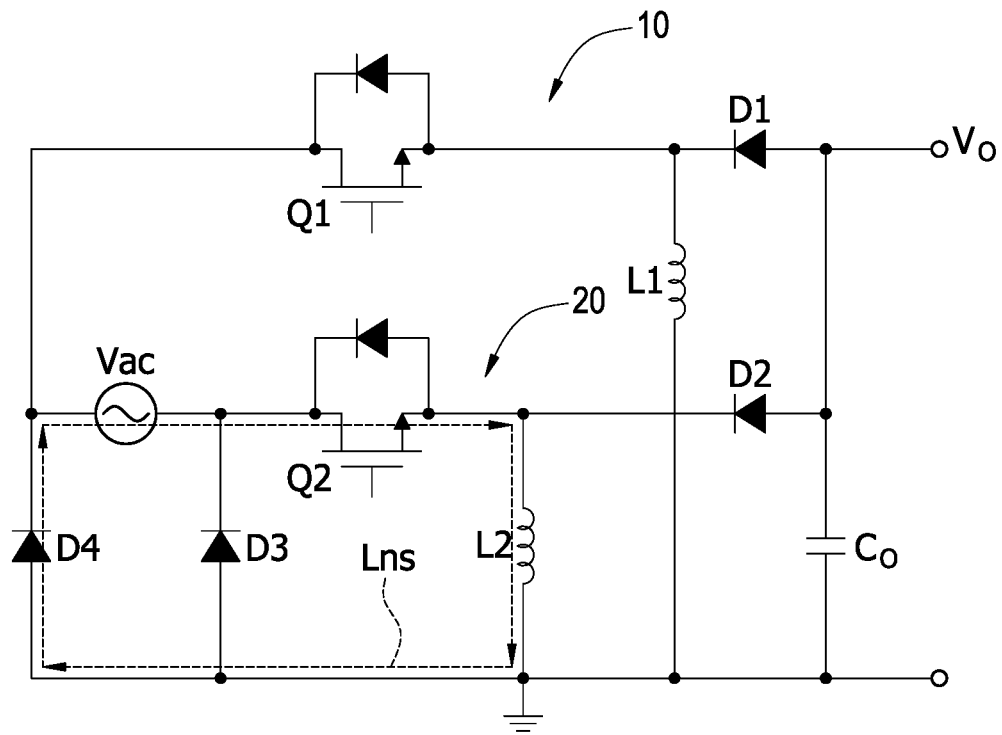
FIG. 11A is a circuit diagram of the bridgeless step-up and step-down AC-to-DC converter in a negative half cycle energy-storing operation according to the present disclosure.
Figure 11B:
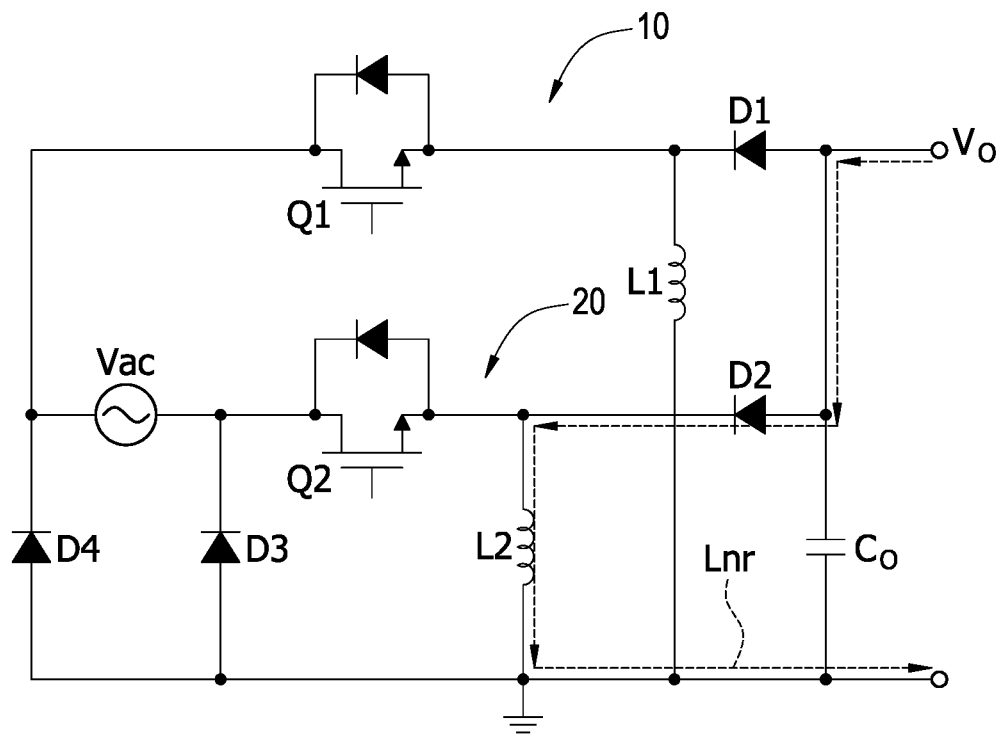
FIG. 11B is a circuit diagram of the bridgeless step-up and step-down AC-to-DC converter in a negative half cycle energy-releasing operation according to the present disclosure.

Please refer to FIG. 11A and FIG. 11B, which show circuit diagrams of the bridgeless step-up and step-down AC-to-DC converter in a negative half cycle energy-storing operation and in a negative half cycle energy-releasing operation according to the present disclosure, respectively. The control end of the second switch Q2 receives a second control signal. When the AC input power source Vac is in a negative half cycle and the second control signal turns on the second switch Q2, the second inductor L2 stores energy. When the AC input power source Vac is in the negative half cycle and the second control signal turns off the second switch Q2, the second inductor L2 releases energy.

As shown in FIG. 11A, the second inductor L2 stores energy through a negative half cycle energy-storing loop Lns. The negative half cycle energy-storing loop Lns is formed by the AC input power source Vac, the second switch Q2, the second inductor L2, the fourth diode D4, and the AC input power source Vac. In this operation, the first switch Q1 can be turned on or turned off.

As shown in FIG. 11B, the second inductor L2 releases energy through a negative half cycle energy-releasing loop Lnr. The negative half cycle energy-releasing loop Lnr is formed by the second inductor L2, a load (not shown) coupled between the positive end and the negative end of the DC output power source Vo, the second diode D2, and the second inductor L2.

In conclusion, the present disclosure has following features and advantages:

1. The PFC converter without using the bridge rectifier circuit, thereby increasing the conversion efficiency.

2. Since the voltage of the DC output power source can be higher or lower than the voltage of the AC input power source, a capacitor with lower withstand voltage at the output end can be selected and used, or power switches with higher withstand voltage can be used to achieve the withstand capacity of the high input surge voltage.

3. No need to add the inrush current limiter, such as the thermistor or relay, thereby avoiding relay sound at activating and can be used as the application of non-network communication.

4. The bridge step-up and step-down AC-to-DC converter can operate in discontinuous conduction mode (DCM), continuous conduction mode (CCM), and boundary conduction mode (BCM).

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A bridgeless step-up and step-down AC-to-DC converter configured to convert an AC input power source into a DC output power source with a positive end and a negative end across an output capacitor, the bridgeless step-up and step-down AC-to-DC converter comprising:
a first circuit having a first end, a second end, and a third end; the first end of the first circuit coupled to a first end of the AC input power source, the second end of the first circuit coupled to a ground end, and the third end of the first circuit coupled to the positive end or the negative end of the DC output power source, wherein the first circuit comprises:
a first switch having a first end, a second end, and a control end; the first end of the first switch coupled to the first end of the AC input power source,
a first inductor having a first end and a second end; the first end of the first inductor coupled to the second end of the first switch, and the second end of the first inductor coupled to the ground end, and
a first diode having a cathode end and an anode end; the cathode end of the first diode coupled to the second end of the first switch and the first end of the first inductor, and the anode end of the first diode coupled to the positive end or the negative end of the DC output power source,
a second circuit having a first end, a second end, and a third end; the first end of the second circuit coupled to a second end of the AC input power source, the second end of the second circuit coupled to the ground end, and the third end of the second circuit coupled to the positive end or the negative end of the DC output power source,
a third diode coupled between the first end of the second circuit and the ground end, and
a fourth diode coupled between the first end of the first circuit and the ground end.

2. The bridgeless step-up and step-down AC-to-DC converter in claim 1, wherein the second circuit comprises:
a second switch having a first end, a second end, and a control end; the first end of the second switch coupled to the second end of the AC input power source,
a second inductor having a first end and a second end; the first end of the second inductor coupled to the second end of the second switch, and the second end of the second inductor coupled to the ground end, and
a first diode having a cathode end and an anode end; the cathode end of the second diode coupled to the second end of the second switch and the first end of the second inductor, and the anode end of the second diode coupled to the positive end or the negative end of the DC output power source.

3. The bridgeless step-up and step-down AC-to-DC converter in claim 1, wherein the control end of the first switch is configured to receive a first control signal; when the AC input power source is in a positive half cycle and the first control signal is configured to turn on the first switch, the first inductor is configured to store energy; when the AC input power source is in the positive half cycle and the first control signal is configured to turn off the first switch, the first inductor is configured to release energy.

4. The bridgeless step-up and step-down AC-to-DC converter in claim 3, wherein the first inductor is configured to store energy through a positive half cycle energy-storing loop; the positive half cycle energy-storing loop is formed by the AC input power source, the first switch, the first inductor, the third diode, and the AC input power source.

5. The bridgeless step-up and step-down AC-to-DC converter in claim 3, wherein the first inductor is configured to release energy through a positive half cycle energy-releasing loop; the positive half cycle energy-releasing loop is formed by the first inductor, a load coupled between the positive end and the negative end of the DC output power source, the first diode, and the first inductor.

6. The bridgeless step-up and step-down AC-to-DC converter in claim 2, wherein the control end of the second switch is configured to receive a second control signal; when the AC input power source is in a negative half cycle and the second control signal is configured to turn on the second switch, the second inductor is configured to store energy; when the AC input power source is in the negative half cycle and the second control signal is configured to turn off the second switch, the second inductor is configured to release energy.

7. The bridgeless step-up and step-down AC-to-DC converter in claim 6, wherein the second inductor is configured to store energy through a negative half cycle energy-storing loop; the negative half cycle energy-storing loop is formed by the AC input power source, the second switch, the second inductor, the fourth diode, and the AC input power source.

8. The bridgeless step-up and step-down AC-to-DC converter in claim 6, wherein the second inductor is configured to release energy through a negative half cycle energy-releasing loop; the negative half cycle energy-releasing loop is formed by the second inductor, a load coupled between the positive end and the negative end of the DC output power source, the second diode, and the second inductor.

9. The bridgeless step-up and step-down AC-to-DC converter in claim 1, wherein the negative end of the DC output power source is coupled to the ground end.

\* \* \* \* \*